3,058,994
PROCESS FOR THE PRODUCTION OF NITRATOALKYL OXETANES
Albert Schrage, Bronxville, N.Y., assignor to Celanese Corporation of America, New York, N.Y., a corporation of Delaware
No Drawing. Filed June 21, 1960, Ser. No. 37,595
6 Claims. (Cl. 260—333)

This invention relates to the production of oxetanes having nitrato groups.

It is an object of this invention to provide a new process for the production of oxetanes having nitratoalkyl groups.

It is an object of this invention to provide a new process for the production of 3,3-bisnitratomethyloxetane.

Other objects of this invention will be apparent from the following detailed description and claims, in which all proportions are given by weight unless otherwise specified.

In accordance with one aspect of this invention, nearly quantitative yields of oxetanes having nitratoalkyl groups such as 3,3-bisnitratomethyloxetane have been produced by treating oxetanes having hydroxyalkyl groups such as 3,3-bishydroxymethyloxetane with nitrogen pentoxide. Other hydroxyalkyl oxetanes which may be used in the process of this invention include 3-hydroxymethyl-3-methyloxetane, 3-hydroxymethyl-3-ethyloxetane and 3-hydroxymethyl-3-chloromethyloxetane.

Advantageously, the nitrogen pentoxide is in solution in a solvent which is unreactive with nitrogen pentoxide or the oxetane being reacted. Such solvents include chloroform, methylene chloride, carbon tetrachloride and ethylene dichloride. The nitrogen pentoxide solution is added slowly to the oxetane such as 3,3-bishydroxymethyloxetane while the latter is cooled efficiently and stirred. The proportion of solvent in the reaction mixture may be suitably in the range of from 40 to 90% of the reaction mixture. The reaction is slightly exothermic and for best results, the reaction temperature should be maintained between about —20° and 15° C.

For best results, a slight excess of 2 moles of nitrogen pentoxide e.g. 2.2 moles is added for every mole of bishydroxymethyloxetane in the initial reaction mixture.

The nitrogen pentoxide is prepared by a process which comprises reacting nitrogen tetroxide vapors with ozone. The reaction is conducted under atmospheric pressure and temperatures preferably in the range of from 0 to 50° C. The ozone, preferably, carried by nitrogen or oxygen is fed into a reaction zone simultaneously with nitrogen tetroxide.

During the process of this invention, it has been found that nitric acid will be formed. If desired, such nitric acid may be inactivated by including in the reaction mixture a highly polar compound which will react with the nitric acid to form a complex compound but will not react with the nitratoalkyl oxetane. A preferred highly polar compound is sodium fluoride, others include lithium fluoride, potassium fluoride, calcium fluoride and magnesium fluoride. The preferred proportion of high polar compound in the reaction mixture is about equal in weight to the nitrogen pentoxide used.

The following examples will serve to further illustrate this invention:

*Example I*

A gaseous mixture comprising ozone and oxygen, each liter of said mixture containing 4 mg. of ozone is passed through a reaction zone at the rate of 10 liters per hour while nitrogen tetroxide vapor is simultaneously passed through the reaction zone at atmospheric pressure at 10 liters per hour. The reaction is exothermic.

The gaseous mixture containing the reaction product emerging from the reaction zone is then cooled to —80° C. to crystallize the nitrogen pentoxide product.

*Example II*

To a slurry of 2.0 g. (0.017 mole) of 3,3-bis(hydroxymethyl)-oxetane in 10 ml. of chloroform is added 4.0 g. (0.037 mole) of nitrogen pentoxide as a 10 to 15 wt. percent solution in chloroform with stirring. The mixture is cooled to 0° C. before addition begins and the rate of addition controlled so as to keep the temperature below 10° C. After the addition is complete, the temperature is allowed to rise slowly to 25° C. and the reaction mixture is then poured over ice. The organic layer is separated and the solvent is evaporated in a stream of dry air. The residue is an essentially quantitative yield of 3,3-bis(nitratomethyl)oxetane, melting at 89° C. It can be recrystallized from chloroform to give a white crystalline material melting at 90° C.

*Example III*

To a mixture of 2.0 g. of sodium fluoride and 2 g. (.017 mole) of 3,3-bishydroxymethyloxetane at 0° C., there is added with continual stirring over a period of 30 minutes a solution of 4 g. (.037 mole) of nitrogen pentoxide prepared as described in Example I, in 40 g. of chloroform. An exothermic reaction occurs and the addition is sufficiently slow to maintain the temperature at about 4° C. The reactants are allowed to warm to room temperature and then poured over ice, after which the chloroform layer is separated from the ice water layer and evaporated in an air stream leaving the 3,3-bisnitratomethyloxetane product as the residue.

As will be seen from the above examples, the process of this invention provides a process for the synthesis of nitratoalkyl oxetane substantially without any attendant rupturing of oxetane rings.

While there have been described what are at present considered to be the preferred embodiments of this invention, it will be obvious to those skilled in the art that various changes and modifications may be made therein without departing from the invention and it is, therefore, aimed to cover all such changes and modifications as fall within the scope of this invention.

What is claimed is:

1. A process for making nitratoalkyl substituted oxetanes which comprises reacting nitrogen pentoxide with hydroxyalkyl substituted oxetanes.

2. The process set forth in claim 1 wherein said reaction is conducted in the presence of a highly polar compound which combines with nitric acid formed during the process to form a complex compound and which is unreactive with the nitratoalkyl substituted oxetanes.

3. A process for making 3,3-bisnitratomethyloxetane which comprises reacting nitrogen pentoxide with 3,3-bishydroxymethyloxetane.

4. The process defined in claim 3 wherein said reaction is conducted in the presence of sodium fluoride.

5. A process for making 3,3-bisnitratomethyloxetane which comprises reacting 3,3-bishydroxymethyloxetane with nitrogen pentoxide in a solvent which is unreactive under the reaction conditions.

6. The process set forth in claim 5, wherein said solvent is chloroform.

No references cited.